Dec. 1, 1964 — W. E. HAAS — 3,158,964
STRUCTURAL CONNECTOR
Filed June 29, 1962
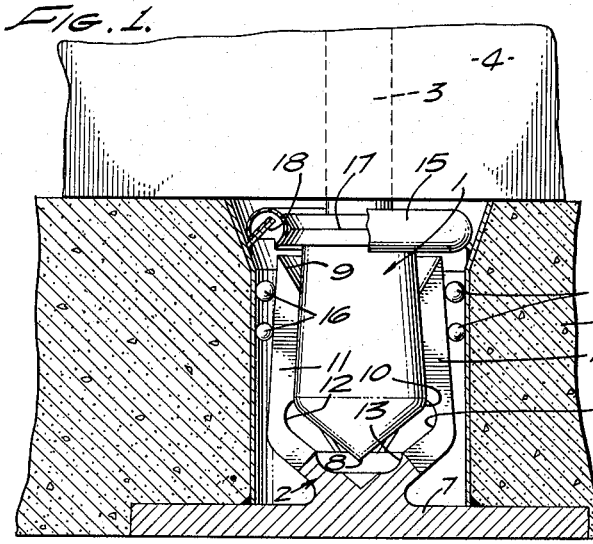
FIG. 1.
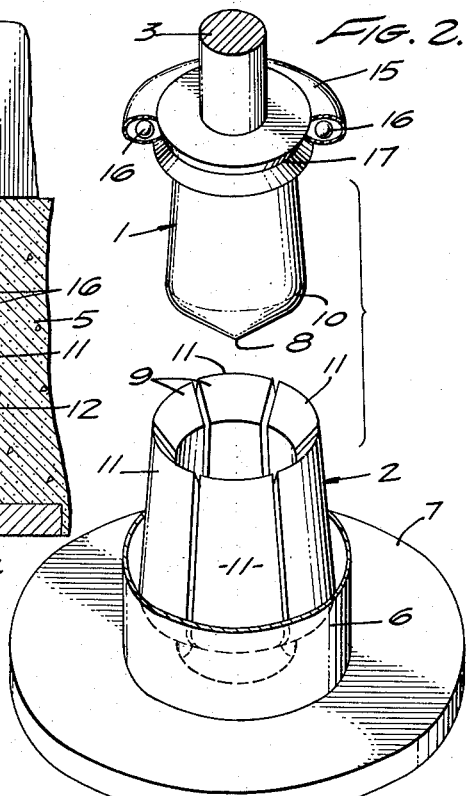
FIG. 2.
FIG. 3.
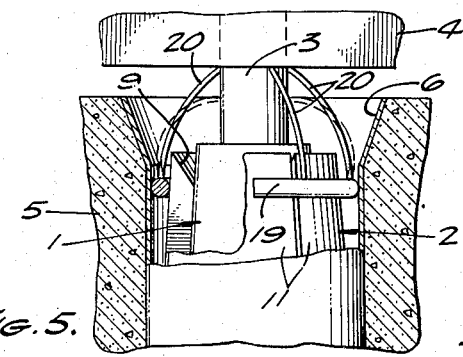
FIG. 5.
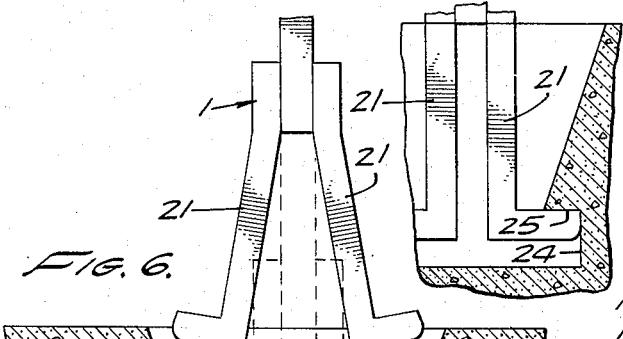
FIG. 6. FIG. 7.
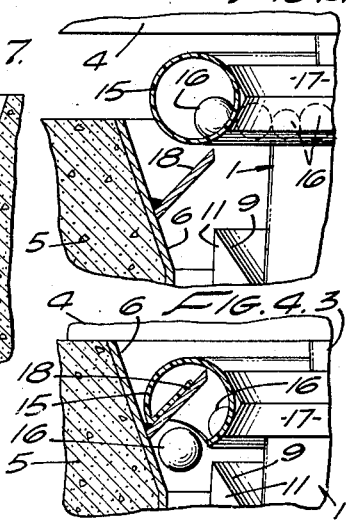
FIG. 4.
INVENTOR.
WILSON E. HAAS
BY Lyon & Lyon
ATTORNEYS

United States Patent Office 3,158,964
Patented Dec. 1, 1964

3,158,964
STRUCTURAL CONNECTOR
Wilson E. Haas, Santa Barbara, Calif.
(644 High Road, Palm Springs, Calif.)
Filed June 29, 1962, Ser. No. 210,607
11 Claims. (Cl. 50—442)

This invention relates to structural connectors which may be used to join together structural units such as walls, roofs, floors, columns, etc. More particularly, the present invention relates to a structural connector which, because of a unique interlocking arrangement, permits the joining together of structural units without the use of the concrete forms, temporary propping, anchoring devices, concrete columns, steel columns, weldings, etc., which are conventionally used. Even though these conventional means are not required, the connectors of the present invention are such that they permit the construction of united structures which are sufficiently strong to meet building code requirements, particularly those requirements regarding lateral resistance to wind and earthquakes.

It is an object of the present invention to provide an improved structural connector for the joining together of structural units.

It is another object of the present invention to provide a structural connector which permits the construction of structural units without resort to concrete forms, temporary anchoring devices, concrete columns, steel columns, welding and the like.

It is a further object of the present invention to provide a structural connector which automatically brings the parts to be joined together into proper alignment.

It is a still further object of the present invention to provide structural connectors which are self-locking.

It is still another object of the present invention to provide a process for uniting structural units, which process employs the structural connector of the present invention.

Other objects and advantages of the present invention will be readily apparent from the following detailed description of the preferred embodiment thereof.

Briefly, the present invention comprises a structural connector with members in plug-socket relation with each other. When assembled, the members form a permanent connection. In a preferred embodiment of the present invention, the structural connector is also provided with a self-locking device which operates to lock the members together after they have been assembled. Furthermore, the present invention also comprises the process of injecting a binder into the cavity formed by the previously described socket.

For a better understanding of the present invention, reference may be had to the accompanying drawing in which:

FIGURE 1 illustrates one embodiment of the present invention after it has been assembled, in vertical cross section.

FIGURE 2 is a pictorial view of one embodiment of the plug or insert and flexible socket which comprise the connector of the present invention.

FIGURE 3 illustrates, in partial vertical cross section, one embodiment of the self-locking means of the present invention before the locking means have been released.

FIGURE 4 illustrates the locking means of FIGURE 3 after the locking means have been released.

FIGURE 5 illustrates a modification of the self-locking means.

FIGURE 6 illustrates another embodiment of the connector of the present invention in which the insert is flexible and the socket is rigid.

FIGURE 7 illustrates a modification of the insert of the type illustrated in FIGURE 6.

FIGURES 1 to 4 illustrate one embodiment of the present invention in which the self-locking means comprise balls. The basic elements of this embodiment are pin 1 and socket 2. Pin 1 is welded, or joined by other appropriate means, to reinforcement bar 3 which is positioned in one of the structural elements 4 to be joined. For purposes of description, element 4 is illustrated as a wall and the other structural element 5 is illustrated as a foundation. Socket 2 is provided with cylindrical sleeve 6 which is concentric with socket 2 and spaced therefrom. Socket 2 is also provided with base portion 7 which operates to anchor socket 2 in foundation 5. Pin 1 is provided with pointed end 8 and rounded shoulder 10. Socket 2 is also provided with flexible fingers 11, groove 12 and groove 13. These grooves may be considered the "hinges" for fingers 11. Socket 2 and base 7 may be integral or may be joined by any suitable method, e.g., welding. Fingers 11 are provided with sloped surfaces 9 at their upper extremities.

Pin 1 is provided with plastic container 15, which container encloses steel balls 16. These steel balls are preferably of various sizes. Pin 1 is provided with groove 17 which functions to hold container 15 in position. Sleeve 6 is provided with knife-like element 18.

In operation, the embodiment of the present invention illustrated in FIGURES 1 to 4 functions to securely join wall 4 to foundation 5. Wall 4 is lowered toward foundation 5 such that pin 1 is in general alignment with socket 2. As the lowering of the wall continues, point 8 of pin 1 encounters sloped surfaces 9 of fingers 11, whereby pin 1 is guided into socket 2. Since the internal diameter of fingers 11 at the lower extremity of sloped portion 9 is smaller than the largest diameter of pin 1 located at rounded shoulder 10, fingers 11 are forced open by pin 1 as the pin is lowered into the socket. When pin 1 reaches its lowermost position, as illustrated in FIGURE 1, it is held under tension by fingers 11.

As the pin approaches the end of its downward path, knife-like element 18 is brought adjacent to container 15. As most clearly illustrated in FIGURES 3 and 4, container 15 is ruptured by knife-like element 18 during the downward movement of pin 1. This rupturing causes steel balls 16 to be released and to drop into the space between fingers 11 and sleeve 6. As most clearly illustrated in FIGURE 1, the external surface of pin 1 and the internal surfaces of pin 11 have a mating configuration such that fingers 11 function to tightly grip pin 1 when the pin has come to rest at its lowermost position. Thus, the combined action of flexible fingers 11 and steel balls 16 operates to rigidly and firmly grip pin 1 and support wall 4.

Particular attention is invited to the double hinging provided by the grooves 12 and 13. These grooves provide for self-adjustment of the fingers 11 such that they will grip pin 1 along the entire length of the fingers rather than at just one point as might otherwise occur from a slight misalignment of the pin 1 with the fingers 11. The lower groove 13 provides for adjustment of the diameter of the socket and permits positioning of groove 12 such that the fingers may adjust themselves to the slope of the pin. Such adjustment is necessary in those cases where the pin and socket are not in precise alignment. When there is precise alignment, the fingers would, of course, grip the pin along their entire length. However, since precise alignment of the pin and socket are difficult to effect, as well as expensive and time consuming, because there is such a large number of factors which affect location, such as slight distortions in the lower surface of the wall or the upper surface of the foundation, the grooves make it possible to achieve full contact between the pin and socket even though the members may be somewhat out of alignment. It will immediately be apparent to one skilled in the art that the increased tolerance permitted by the grooves 12 and 13 is a highly desirable feature of the present invention.

This double hinge self-adjusting feature can, of course, be effected by means other than the location of the two grooves as shown in FIGURE 1. For example, both the pin and the socket could comprise single hinged fingers with opposing tension. The double hinging available from the two single hinges would permit the fingers in the pin to fully engage the fingers in the socket.

It is preferred to inject concrete grout or another similar compound into the space between fingers 11 and sleeve 6 to protect the connector elements against corrosion. This injection should be made after the balls have fallen into place, but before the wall is completely lowered, so that an access crack exists which is large enough to admit the nozzle of a grout gun. Therefore, knife-like elements 18 should be positioned such that the container 15 is ruptured before the wall is completely lowered.

FIGURE 5 illustrates an alternative type of locking means combined with the socket and pin assembly illustrated in FIGURES 1 and 2. In this embodiment the locking means comprising steel rod 19 is substituted for the balls of the embodiment shown in FIGURES 1 to 4. Rod 19 is circular in configuration and is suspended from bar 3 by flexible hangers 20. In operation, as the wall descends, the hangers 20 jam the rod 19 against fingers 11. Because of their flexible nature, the hangers continue to be deflected as the wall continues to lower and continues to urge rod 19 into locking engagement with fingers 11 and sleeve 6. This embodiment has been found to be particularly suitably for use with heavy walls which are exposed to heavy winds or other severe conditions.

The force of the tension exerted by fingers 11 is created by the weight of the wall as the wall is lowered into position. This force will be less than the weight of the wall, but most building codes require only that anchorage or lateral force resistance be equal to 20% of the weight of the wall, plus 20% or less of the roof load or other tributary loads. Depending upon the magnitude of the tributary loads, variations between building codes, and the degree of efficiency of a particular design of connector, the tension of the fingers may be the only holding force necessary. In some cases, it is advantageous to add temporary weights to the wall while it is being lowered into place, and thereby make it possible to employ a connector with greater holding power. In other cases, suppleemntal anchoring means may be necessary, such as the self-locking means 16 and 19 which have previously been described.

In the embodiments illustrated in FIGURES 6 and 7, pin 1 is provided with flexible fingers 21. In FIGURE 6, the structural unit to which the unit provided with pin 1 is to be joined is provided with a cavity comprising sloped portions 22 and 23. The cavity is filled with wet concrete or a similar composition before the pin is inserted therein. The primary purpose of the concrete is to protect the connector from corrosion, but, after hardening, the concrete also adds to the strength of the connection. The pin 1 and fingers 21 are preferably made of metal while the cavity may simply be molded in the proper shape in the structural member into which the pins are to be inserted. As the fingers 21 are lowered into the cavity, sloped portions 21 cause the fingers to be compressed, thereby putting them under tension. As the pin approaches its lowermost position, sloped portion 23 permits the fingers 21 to expand slightly. The fingers thus lock the pin 1 in place while the concrete in the cavity hardens. When the concrete has hardened, a strong structural connection is made.

The modification illustrated in FIGURE 7 is generally similar to that of FIGURE 6, with the exception that a notch comprising surfaces 24 and 25 is substituted for the sloped portion 23 of FIGURE 6. This notch may be singular or may be a series of notches. In fact, the surfaces of the pin and the fingers of FIGURE 1 could be notched or grooved such that the notches or grooves on the pin would engage the notches or grooves on the fingers. Such notches or grooves provide good holding power, but may lead to dangerous looseness in the connector, particularly when high walls or columns are connected to foundations. For example, in the case of a wall 20 feet high attached to a foundation, an error of .007 inch in the location of the socket or pin can result in a wall tilting 8.76 inches out of alignment. If the pin and socket are provided with six notches per inch (the size of threads on a 1½ inch bolt), they will not meet properly in the event of a .007 inch misalignment and will slip back .16 inch to the next series of notches. Thus, a right triangle in which the length of the wall (240 inches) is one leg and the length plus the "slip" of .16 inch is the hypotenuse may be envisioned. Application of the Pythagorian theorem gives the result that the other leg of the right triangle is 8.76 inches, i.e., the quantitative measure of misalignment of the wall.

Notches or grooves may be used, however, when flat roofs are attached to a wall. In this case, a slip back of .16 inch may not be consequential to the roof but will only result in a slight increase in the crack which will exist anyway between the roof and wall. This crack would have to be closed with mortar, grout, or similar compound in any event.

It has been found that the embodiment of FIGURE 7 imparts somewhat increased strength to the connection, but that it is also somewhat difficult to cause pins 21 to fully engage surface 25 of the notch. Therefore, greater care is required when assembling a structure in which the connector of FIGURE 7 is employed.

While exact precision is not necessary in spacing the pins and sockets of the present invention, it is obvious that reasonable accuracy is required. It has been found that templates may be used to position the sockets in the structural unit which is to contain them. This spacing will, of course, vary according to the particular type and environment of structural unit which is used.

It will be obvious to one skilled in the art that many modifications and variations of the embodiments previously described are possible without departing from the scope of the present invention. For example, many types of materials other than those mentioned in the foregoing description may be used. The only requirement is that the materials used have the necessary structural properties for the particular purpose for which they are used. In the embodiment shown in FIGURES 1 to 4, the container rupturing means may comprise sharp edges or points at the ends of fingers 11 rather than knife-like element 18. In the embodiment illustrated in FIGURE 5, one or more spherical, elliptical, or similarly shaped elements may be provided at the ends of hangers 20 rather than the rod illustrated in FIGURE 5. Furthermore, this rod need not be circular but may comprise sections of a circle. The cross section of rod 19 need not be circular but may be elliptical or any other suitable shape. Still further, sleeve 6 may be omitted entirely and the wall of the cavity in which the socket is positioned may be used to perform the functions of sleeve 6. In the embodiments illustrated in FIGURES 6 and 7, any number of fingers 21 may be used. Furthermore, the cavities illustrated in FIGURES 6 and 7 may be lined with a metal, plastic, or similar material if desired.

The connectors of the present invention eliminate the need for the use of reinforced concrete to join together structural units. This, of course, means that the forms necessary to contain the fresh concrete, the lifting of the concrete into place, temporary propping and anchoring devices and the delay in construction during curing of the concrete are eliminated. Nor are steel columns, beams or other structural members required to effect the connections. Also eliminated is welding, and the providing of access openings for welding, as well as the subsequent closing and patching of the openings.

The embodiments illustrated in FIGURES 6 and 7 are not quite as strong as those illustrated in FIGURES 1 to 5, but have the compensating advantages of economy in cost and are particularly suitable when sockets must be embedded in relatively narrow and long structural members, such as walls when roofs are connected thereto.

Having fully described the present invention, it is to be understood that it is not to be limited to the details set forth, but is of the full scope of the appended claims.

I claim:

1. A structural connector comprising: a pin member having an outwardly diverging tapered external surface; a socket member comprising a plurality of flexible fingers resiliently engageable along said tapered external surface of said pin member; a sleeve fixedly mounted in radially spaced relation outwardly of said socket member; and locking means carried by said pin member, said locking means being adapted to be interposed between said socket member and said sleeve to hold said fingers in locking engagement with said outer surface, whereupon insertion of said pin member into said socket, said locking means is disposed between said sleeve and the exterior of said socket member and locks said fingers to said pin member.

2. A structural member as defined in claim 1, wherein said flexible fingers are connected to said socket members by double hinge means to provide for hinging movement of each finger at two spaced points whereby said fingers are capable of fully contacting said pin member when said pin member and said socket member are slightly out of alignment.

3. A structural connector as defined in claim 1, wherein said locking means comprises a plurality of spherical elements.

4. A structural connector as defined in claim 3, wherein said spherical members are releasably enclosed in a rupturable container carried by said pin member and wherein rupturing means are provided on said sleeve for releasing said spherical members nnto wedging relation between said fingers and said sleeve when said pin member is introduced into said socket member.

5. A structural connector as defined in claim 4, wherein said means for releasing said spherical elements comprises a cutting element fixedly mounted with respect to said socket and engageable with said container at the time said pin member is introduced into said socket member to rupture said container and release said spherical elements.

6. A structural member as defined in claim 5, wherein said cutting element is mounted on said sleeve at a level such as to engage said container as said pin member moves into said socket member but before said pin member is fully received therein.

7. A structural member as defined in claim 3, wherein said spherical elements are of different sizes.

8. A structural connector comprising: a pin member having an outwardly diverging tapered external surface; a socket member comprising a plurality of flexible fingers resiliently engageable with said external surface of said pin member; a sleeve fixedly mounted in radially spaced relation outwardly of said socket member; and locking means carried by said pin member, said locking means being adapted to be interposed between said socket member and said pin to hold said fingers in locking engagement with said outer surface, said locking means including a rod-like element, whereby insertion of said pin member into said socket, said locking means is disposed between said sleeve and the exterior of said socket member and locks said fingers to said pin member.

9. A structural connector as defined in claim 8, wherein said rod-like element is flexibly suspended from said pin member.

10. A structural connector as defined in claim 9, wherein said rod-like element is an annular member supported at the ends of a plurality of flexible fingers extending from said pin member for positioning said rod-like element between said sleeve and said pin member and for resiliently urging said locking element into wedging relation therebetween.

11. A structural connector comprising: a pin member having an outwardly diverging tapered external surface; an annular collar fixed on said pin member; a frangible annular container mounted on said collar releasably holding a plurality of spherical elements; a base member; a socket member centrally mounted on said base member and comprising a plurality of flexible fingers extending upwardly therefrom for resilient engagement with said external surface of said pin member; a sleeve fixedly mounted on said base member in radially spaced relation outwardly of said socket member; and a cutting element mounted on said sleeve and having a cutting edge positioned to rupture said container as said pin member is moved into said socket member to thereby release said spherical elements into wedging relation between said pin member and said sleeve.

References Cited in the file of this patent

UNITED STATES PATENTS

| 428,063 | Boda | May 20, 1890 |
|---|---|---|
| 892,333 | Thaub | June 30, 1908 |
| 1,034,185 | Armstrong | July 30, 1912 |
| 1,644,035 | Rocic | Oct. 4, 1927 |
| 2,041,444 | Supplie | May 19, 1936 |
| 2,091,882 | Robinson | Aug. 31, 1937 |
| 2,102,999 | De Vries | Dec. 21, 1937 |
| 2,135,118 | Stewart | Nov. 1, 1938 |
| 2,781,658 | Dobell | Feb. 19, 1957 |
| 3,027,609 | Parkin et al. | Apr. 3, 1962 |

FOREIGN PATENTS

| 464,136 | Great Britain | Apr. 12, 1937 |
|---|---|---|
| 638,813 | Great Britain | June 14, 1950 |